(12) United States Patent
Hautala

(10) Patent No.: US 9,085,851 B2
(45) Date of Patent: Jul. 21, 2015

(54) PRESSURE FILTER

(76) Inventor: Jouko Hautala, Tampere (FI)

( * ) Notice: Subject to any disclaimer, the term of this patent is extended or adjusted under 35 U.S.C. 154(b) by 497 days.

(21) Appl. No.: 13/635,419

(22) PCT Filed: Mar. 16, 2010

(86) PCT No.: PCT/FI2010/000020
§ 371 (c)(1),
(2), (4) Date: Sep. 15, 2012

(87) PCT Pub. No.: WO2011/113990
PCT Pub. Date: Sep. 22, 2011

(65) Prior Publication Data
US 2013/0001151 A1    Jan. 3, 2013

(51) Int. Cl.
| | |
|---|---|
| *B01D 29/64* | (2006.01) |
| *B07B 1/20* | (2006.01) |
| *D21D 5/02* | (2006.01) |
| *B01D 29/00* | (2006.01) |

(52) U.S. Cl.
CPC ............. *D21D 5/026* (2013.01); *D21D 5/02* (2013.01); *B01D 29/0077* (2013.01); *B01D 29/6476* (2013.01); *B07B 1/20* (2013.01)

(58) Field of Classification Search
None
See application file for complete search history.

(56) References Cited

U.S. PATENT DOCUMENTS

| 3,785,495 A | * | 1/1974 | Holz .............................. 210/210 |
| 4,267,035 A | * | 5/1981 | Martin .......................... 209/273 |
| 5,096,127 A | * | 3/1992 | Young ......................... 241/46.17 |
| 5,119,953 A | * | 6/1992 | Atkeison et al. .............. 209/273 |

FOREIGN PATENT DOCUMENTS

WO    WO2004/046457 A1 *  6/2004

* cited by examiner

*Primary Examiner* — Thomas M Lithgow

(57) ABSTRACT

Pressure filter for filtering pulp which pressure filter comprises a pulp container (1, 3) comprising a feed opening (12) of the pulp at its upper part, a cylindrical filtering surface (6) adjusted to the cylinder part of the container in which case the pulp, which has penetrated the mentioned surface, can be removed from the container through one removal aggregate or through several removal aggregates (13), (14) located at various altitudes, further the pulp container comprises a vertical rotor (8, 16, 17) which can be rotated in the pulp room of the container which rotor is equipped with wings (7) which clean the filtering surface (6) and comprises a feed pipe (11) of the dilution water for directing the dilution water into the pulp room of the container in order to avoid the thickening of the pulp and that the dilution water can be directed between the rotor and the filtering surface (6) to such height that beginning from the lower edge of the filtering surface (6) at least an essential part of the filtering surface, such as over 30% of the filtering surface (6) comes within the range of the mass which has been diluted with the dilution water. The rotor (8, 16, 17) is equipped with wings (9) in that part of the pulp room to which the dilution water is directed in which case the mentioned wings (9) are adjusted together with the gaps (10) to achieve an internal, vertical pulp cycle at the lower part of the pulp room when the rotor is rotating in which case the mentioned part of over 30% of the filtering surface (6) is within the range of the mentioned pulp cycle.

4 Claims, 1 Drawing Sheet

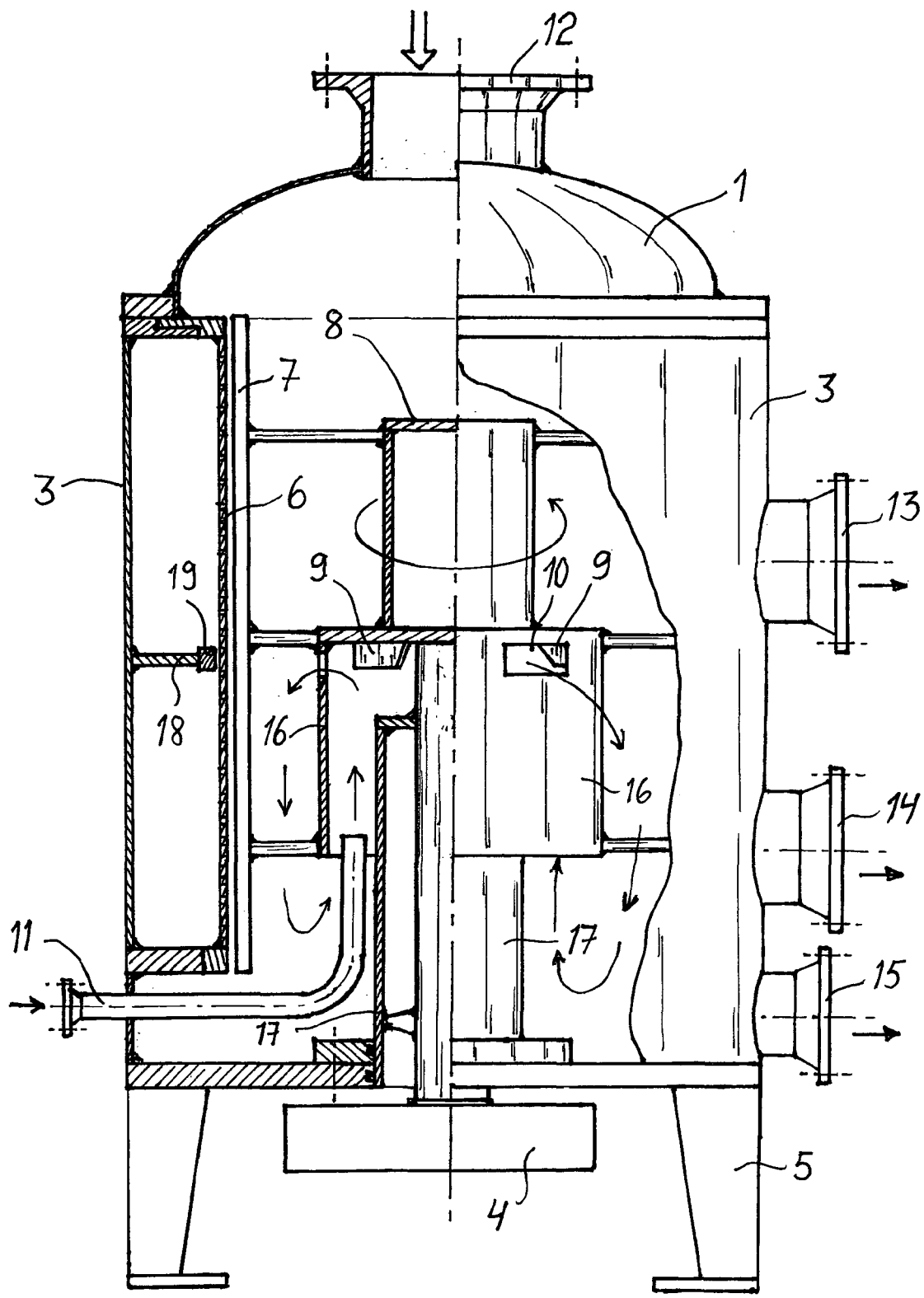

PRESSURE FILTER

Invention relates to a pressure filter for filtering pulp which pressure filter comprises a pulp container comprising a feed opening of the pulp at its upper part, a cylindrical filtering surface adjusted to the cylinder part of the container in which case the pulp which has penetrated the mentioned surface are removed from the container through one removal aggregate or through several removal aggregates located at various altitudes, further the pulp container comprises a vertical rotor which can be rotated in the pulp room of the container which rotor is equipped with wings which clean the filtering surface and comprises a feed pipe of the dilution water along which the dilution water is directed to the pulp room of the container in order to avoid the thickening of the pulp.

With these pressure filters pulp which is needed for manufacturing paper and board is purified and their implementation area is very large and according to each implementation the structure and form of the filter, rotor and filtering surface are changed. The pulp which is to be purified in the filter is divided into an accept and a reject. The accepted reject continues forward in the process and the rejected will be retreated so that it can be usually purified more, grounded or it will be totally removed from the process. Sometimes the pressure filter is used to fractionate fibres, too, in which case the fibres of the accept are on average clearly shorter or even thinner and more elastic than the fibres of the reject.

When the pulp is being purified/fractionated, the thickness of the pulp tends to increase during the filtering because the water part of the pulp fraction has an easier access through the filtering surface than the fibres have. One has tried to decrease this thickening phenomenon with the design of the rotor, especially with the design of the purifying wings so that when they rotate, they suck water back to the inside of the filtering surface. This kind of action causes harm especially when one tries to fractionate the pulp because then also short and elastic fibres come back along the water and this phenomenon lessens the efficiency of the fractionating.

One has tried to solve the thickening phenomenon of the pressure filter at the filtering surface with the solutions according to the patent specifications U.S. Pat. No. 6,679,384 B1 and SE-526033. In both solutions the dilution water is brought with the help of special dilution rings built in the cylinder. In the solution according to the U.S. Pat. No. 6,679,384 B1 the parts 33 and 34 function as rings and in the solution according to the SE-526033 it is the ring 28. Of these in the solution according to the U.S. Pat. No. 6,679,384 the accepted pulp is taken out of three different pipes 60, 61 and 62, whereas in the solution according to the SE-526033 there is only one pipe fitting of the accepted pulp and a pipe 18. Also in the Finnish patent application FI 961569 three pipes 9a-c of the accepted pulp are shown. In the solution according to the publication U.S. Pat. No. 6,679,384 there are dilution water canals at the location of the pipes 50 and in the FI-961569 solution there are ring-shaped dilution water canals 12a and 12b in the casing of the filter at the location of the pipes 13a and 13b.

In these above mentioned publications there are opposite gaps in both the dilution water rings and in the thrust ring of the cylinders from which gaps the dilution water streams inside the cylinder. In both solutions there are three successive cylinders. In the U.S. Pat. No. 6,679,384 solution X, Y and Z from below to upwards and in the FI-solution 7a, 7b and 7c from above to downwards. In the solution according to SE-526033 the sorting surface is divided into two pieces at the location of the dilution ring 48. The above mentioned solutions are expensive to build regarding both the frame of the filter and the cylinder. Also the impact of the dilution water fades fairly soon and it is directed to a fairly small pulp part immediately next to the filter surface.

With the pressure filter according to the invention the above mentioned problems can be solved and a considerable improvement regarding the efficient utilization of the dilution water can be achieved. It is characteristic of the invention that the dilution water is directed between the rotor and the filtering surface to such height that beginning from the lower edge of the sorting surface at least an essential part of the filtering surface, such as over 30% of the filtering surface comes within the range of the pulp which has been diluted with the dilution water when the rotor is rotating.

The advantage of the invention is the fact that the dilution water rings can be abandoned. Although the dilution water is directed along only one pipe to one location between the rotor and the filtering surface, the mixing of the dilution water to the whole pulp surrounding the rotor occurs nevertheless in a balanced way. Also the internal pulp cycle makes sure that the dilution water circulates partly the same cycle, too, in which case it has time to give a dilution effect to the pulp before it penetrates the filtering surface.

In the following the invention is described more detailed by referring to the accompanying drawing, FIG. 1. The pressure filter of the FIG. 1 has parts that can be seen from outside, such as the lid 1 of the container, its frame part 3 which is a cylindrical casing or chamber, a control unit 4, feet 5 and aggregates 11-15. The pressure filter is equipped with a cylindrical cylinder 6 which functions as the filtering surface and in the middle of which cylinder there is a rotating rotor 8, 16, 17. Wings 7 that clean the filtering surface 6 are attached to the rotor by arms and there are at least 2 wings, the bigger filters have even 10 wings. In the FIG. 1 they are uniform bars which have the height of the filtering surface 6.

There is a feed aggregate 12 of the pulp to be purified at the upper part of the filter, a removal aggregate 13 of the purified pulp and also another removal aggregate 14 located farther down for the accepted pulp. A ring-shaped collection room of the accepted pulp outside the filtering surface 6 is divided into two parts with the help of a flange 18 by using a supporting ring. The pulp reject is removed from the bottom of the container from the aggregate 15.

Enough space is left between the supporting structure 17 of the bearing of the rotor and the cylindrical lower part or wall 16 of the rotor so that the dilution water pipe 11 can be extended and can be turned till this space. There are gaps 10 at the upper part of the cylindrical part 16 of the rotor from which gaps the pulp together with the dilution water can stream out. There are pumping wings 9 that rotate the pulp at the inside and at the upper part of this cylindrical part 16 which pumping wings are sized in such a way that they circulate clearly more mass than what the stream of the dilution water is out of the pipe 11. A cycle for the pulp is created in which cycle the dilution water becomes well mixed with it and the same mass may bypass the filter surface 6 several times. This kind of pulp cycle occurring in a reject mode is not known in the above mentioned, known solutions.

With this arrangement the dilution water is moved to rise in the pulp room to the height of the flange 18. The dilution water dilutes the sorting surface 6 beginning from the flange 18 at least downwards, in other words dilutes the pulp coming from the aggregate 14 of the accepted pulp and dilutes the pulp coming from the aggregate 15 of the rejected pulp. In this case approximately 50% of the filter surface 6 is impacted by the dilution water, in other words the surface downwards from the flange 18. It is advantageous for the invention that of the filter surface 6 at least 30% is impacted by the dilution water.

The solution can be modified only to filters in which the rotor rotates inside the cylindrical sorting surface. The accepted pulp is taken out of the aggregates 13 and 14. Only one cylinder is shown in the FIG. 1 to which cylinder one has had to install a flange 18 and a supporting ring 19. If in the pressure filter there is only one exit pipe of the accepted pulp, then neither the flange 18 nor the part 19 is needed.

The invention claimed is:

1. Pressure filter for filtering pulp, which pressure filter comprises a pulp container defining a substantially cylindrical chamber; comprising a feed opening for the pulp at its upper part, a cylindrical filtering surface located within of the container in which case the pulp, which has penetrated the mentioned filtering surface as an accept fraction, and is removed from the container through at least one removal outlet from the container, the pulp container further comprises a vertical rotor which is rotatably mounted in the container, which rotor is equipped with radial arms extending to outer wings which clean the filtering surface and said filter further comprises a feed pipe for dilution water and for directing the dilution water into the chamber of the container in order to avoid the thickening of the pulp, and that the dilution water is directed between the rotor and the filtering surface to such height that beginning from a lower edge of the filtering surface to at least over 30% of the filtering surface comes within the range of the pulp which has been diluted with the dilution water, the rotor being equipped with an inner substantially cylindrical wall spaced radially inwardly of the outer wings and having a lower opening for receiving pulp to be recirculated from a lower portion of the chamber upwardly to a position above said lower portion of said chamber, said substantially cylindrical wall defining a recirculation chamber and having gaps in said wall above the lower opening and said rotor having pumping wings within said recirculation chamber for pumping said pulp from said lower portion of the chamber through said gaps for pulp recirculation in said chamber.

2. Pressure filter according to the claim 1, wherein, with the help of pumping wings gaps and the rotation of the rotor, the stream of the circulating mass has been adjusted to be greater than the stream of the fed dilution water.

3. Pressure filter according to the claim 1, wherein, when the filtering surface is divided into two parts in the vertical direction, the dilution water is directed to impact the pulp which meets with at least the lowest part of the divided parts of the filtering surface.

4. Pressure filter according to the claim 1, wherein, when the filtering surface is divided into three or several parts in vertical direction, the dilution water is directed to impact the pulp which meets with the lowest part of the divided parts of the filtering surface and also meets with the following, upper parts in such a way that at least 30% of the filtering surface comes within the range of the pulp which has been diluted with the dilution water.

* * * * *